March 8, 1949.
LIAN-TONG WEN
INSTRUMENT PANEL AND MEANS FOR
ADJUSTING INSTRUMENTS THEREON
2,464,190
Filed Aug. 14, 1946
2 Sheets-Sheet 2
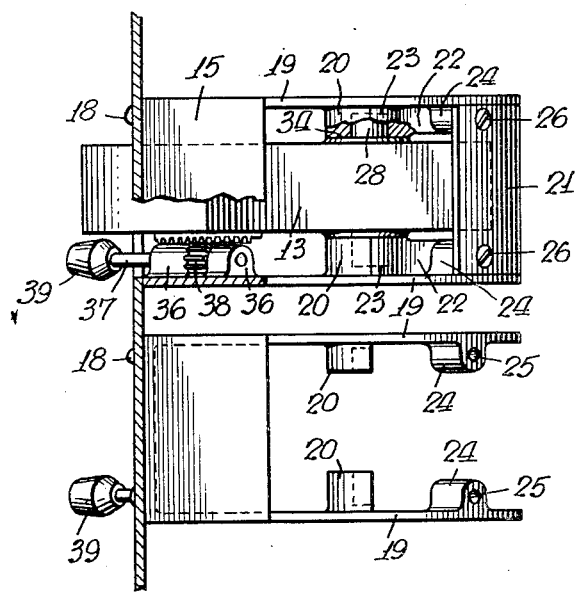
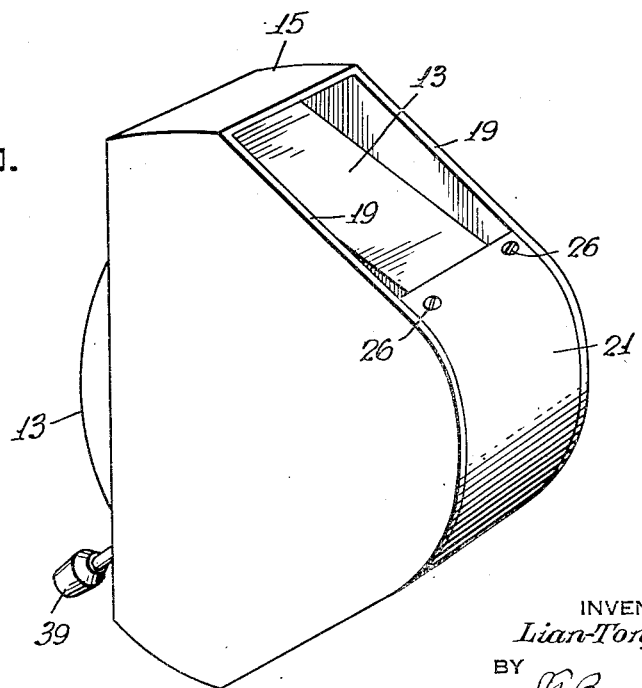
INVENTOR
Lian-Tong Wen
BY
J.A. Basseches
ATTORNEY Patented Mar. 8, 1949

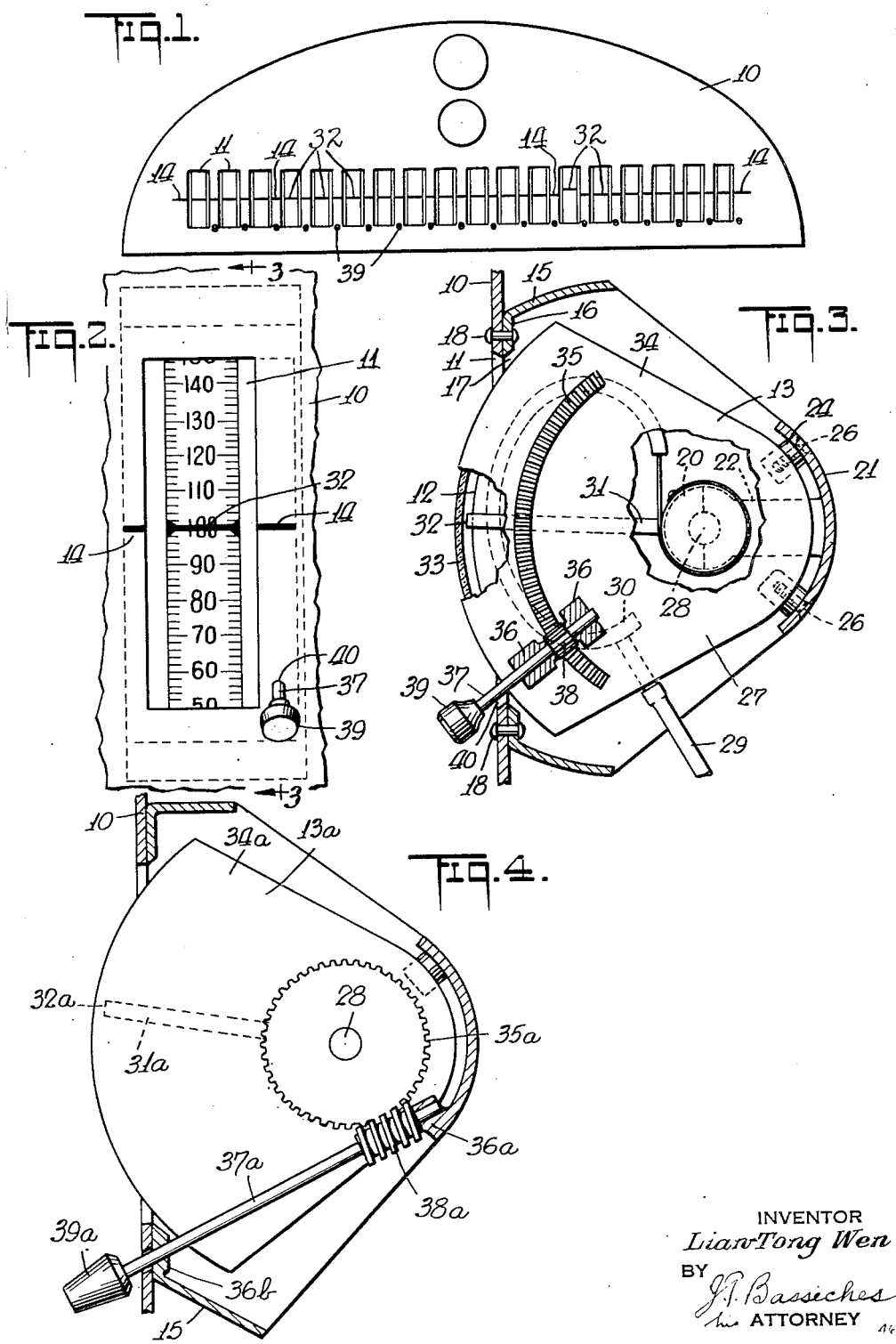

2,464,190

UNITED STATES PATENT OFFICE 2,464,190

INSTRUMENT PANEL AND MEANS FOR ADJUSTING INSTRUMENTS THEREON

Lian-Tong Wen, New York, N. Y., assignor of one-third to Jacob T. Basseches, Scarsdale, N. Y.

Application August 14, 1946, Serial No. 690,417

3 Claims. (Cl. 73—431)

This invention relates to instrument panels; more particularly, to an instrument panel for assembling multiple instruments, such as panels for multiple engine airplanes; still more particularly, to a method of arranging and setting instruments on a panel to facilitate checking and supervision thereof.

It is contemplated by my invention to provide in an instrument panel, an assembly for facilitating supervision of the instruments mounted thereon.

Under present practice, especially in the aviation industry, a maze of instruments is presented for the guidance of the pilot or navigator, necessary in the maintenance of proper operation or control and navigation of the vehicle. It is contemplated by my invention to simplify maintenance and supervision of the multitude of instruments of a panel and to minimize the labor involved in the maintenance of the vehicle from the use of the instrument board.

Accordingly, an object of my invention involves the provision of means for mounting a plurality of instruments, such as meters and gauges, whereby each instrument may be positioned so that its dial face and indicator is positioned with reference to the normal operation of a companion instrument, and thereby simplify the checking and supervisory operation, and minimize any oversight.

It is more specifically contemplated by my invention to provide an instrument panel and mounting means for the instruments with relation to each other so that the indicators thereof may be read at a glance, and a predetermined normal setting checked for any variation therefrom, of the position of the individual instruments in relation to each other and/or some reference indicium.

Still more particularly, it is contemplated by my invention to provide an instrument panel wherein the various instruments are alignable to indicate normal position with respect to some indicium whereby the assembly of instruments as a whole may be checked for any departure from the normal or predetermined position.

It is further an object of my invention to provide a method for setting instruments on an instrument panel whereby normal operation thereof may be quickly and facilely checked, to minimize fatigue and unusual care in the supervision and checking of these control and indicator devices.

To attain these objects and such further objects as may appear herein or be hereinafter pointed out, I make reference to the accompanying drawing forming a part hereof, in which—

Figure 1 is a fragmentary elevation of an instrument panel illustrating one embodiment of my invention;

Figure 2 is a magnified fragmentary portion thereof;

Figure 3 is a section taken on the line 3—3 of Figure 2;

Figure 4 is a view corresponding to Figure 3, employing another embodiment of my invention;

Figure 5 is a fragmentary transverse section, with the instruments in different stages of assembly;

Figure 6 is a rear perspective view of an instrument casing illustrative of my invention.

Making reference to the drawing, I have illustrated my invention in connection with an instrument panel 10 of an airplane.

In accordance with an illustrative embodiment of my invention, the panel is provided with aligned apertures 11, through which are visible the dials 12 of the instruments 13 mounted to the rear face thereof.

In accordance with the illustrated form of my invention for the panel and method of setting the instruments and without intention to limit the same hereto, I contemplate the provision of instruments in the form of meters, having an endwise or partly cylindrical dial as distinguished from circular or disk dials now more generally found in use, and in which latter form the indicator moves clockwise or radially and is read by radial indicia on the dial face.

In accordance with my invention, I make provision for orienting the dials of the instruments with reference to each other so that the normal or predetermined position of the dial and its indicator, in operation will have a spacial position in reference to other dials and their respective indicators, in this way providing some aligned position during normal operation. The control engineer, aviator, navigator or the like checks therefore merely a departure from the normal or predeterminedly desired position of the assembly of instruments and may then readily detect, without critical inspection of each instrument, whether or not there has been a change in condition of the mechanism indicated by the instruments, which requires correction. Thus, in accordance with my invention, I intend to orient the instruments as a whole, so that at their operating stage, the indicators have a fixed relationship to a reference line or to each other and departure from such relative position may be quickly detected at a glance.

By way of illustration, I provide means to mount instruments whose dials such as cylinders or sections thereof are readable edgewise, with means to move the casing to be substantially tangential to the panel on which the instruments are mounted.

Once the vehicle is brought into operation so that the various instruments function, the casings of the instruments, with their indicators, are adjusted so that the indicators are in the crest of dial visible on the panel and aligned with respect to each other, and preferably also, aligned with respect to a line of reference or indicia on the panel itself. In this manner, the indicator of each instrument, in its predetermined position with respect to its dial, is brought, in the illustration given, in an aligned position during predetermined functioning of the vehicle. The aviator, pilot, navigator, or whoever may have the duty of checking the function of the various parts of the vehicle, may then observe at a glance any departure of the indicators from the normal or predetermined setting. Disalignment is immediately observed and the cause therefor checked, to secure proper maintenance and functioning of the vehicle.

Thus, in accordance with my invention, I may have a plurality of instruments, such as a voltmeter, fuel pressure gauge, oil temperature gauge, oil pressure gauge, air speed indicator, altimeter and motor speed indicator, all arranged, employing instruments readable on edgewise dials, the casings whereof are adjustably connected so that the edgewise dials are substantially tangential to the panel and viewable through the aligned apertures 11 shown in the drawing.

To either side of the apertures, I may provide indicia 14 in the form of a reference line, to give one continuous line of reference across the panel.

With the panel thus provided, I then furnish a supporting bracket 15 having an inwardly turned flange 16 having an opening 17 alignable with the opening 11 and held thereby by bolts 18 or like fastening elements. The supporting bracket 15 is extended rearwardly, to provide plates 19, 19, having on their inner faces, one half of bearings 20, 20. A cover plate 21 is provided with an extension 22, carrying the complemental half bearings 23. Bosses 24 are tapped at 25 to receive the screws 26 holding down and seating the cover plate 21. Additionally the half bearings 20 and 23 may have means frictionally to hold the casing in a rotated adjusted position, such as by interposing some spring, or like friction device.

In the illustration given, the instrument 13 has its side walls 27 provided with trunnions 28, arranged to fit the bearings carried by the plates 19, 19, extending from the bracket 15.

The internal details of the instrument are not part of my invention and I therefore merely diagrammatically illustrate the same. It is believed sufficient to state that it includes a flexible connection 29 in the form of other flexible coupling such as flexible tubing, pigtail wiring or the like, to transmit a reading to the variable element 30, which in turn operates the indicator needle 31 so that its extension 32 is readable edgewise on the edgewise dial 12.

The instrument casing, with its dial and indicator, is covered by the usual glass or crystal 33, which projects and is viewable through the openings 11 in the panel so that the dial 12 is substantially tangential to the panel or partly projects through the opening 11 by reason of the journalled position of the trunnions 28 in the bearings carried by the plates 19, 19.

In the illustration given, each of the instruments 13 has its forward portion 34 of the casing side wall 27 and from which the trunnions 28 extend provided with an annular rack 35 which is concentric with the axis through the trunnions 28. Spaced bearings 36, 36 journal a shaft 37, to which is keyed the pinion 38, meshing with the rack 35. A knurled knob 39 serves to rotate the shaft 37 and, in turn, the pinion 38 meshes with the rack 35. The shaft 37 projects through an aperture 40 in the panel and its control knob 39 is available on the front face of the panel.

It will be observed from the construction described that by manipulation of the knob 39, the instrument 13 may be rotated about the axial line passing through the bearings formed on the spaced plates 19, 19, to adjust the dial within limits in any desired position, bodily carrying with it the indicator 32 of the instrument 13, due to the flexible connection 29 provided for the instruments. Friction means (not shown) hold the casing in the position of adjustment against movement due to vibration of the vehicle.

With a panel thus provided, each aperture 11 having visible therethrough an arcuately adjustable, substantially tangentially directed instrument casing, adjustment for inspection and observation of the panel will now be described.

As the instruments function during operation, to a predetermined setting as indicated by the relative position of the indicator point 32 with respect to the dial 12 and its graduations, the navigator or engineer then adjusts the knob 39 so that the entire casing of the instrument 13 is rotated to the point where the indicator 32 is aligned with the reference indicia 14. The engineer, navigator, or pilot performs the same operation for each one of the instruments by successive manipulation of the knobs 39 which project adjacent the apertures 11 until all of the indicators are aligned with reference to the reference indicia 14.

Maintenance of this predetermined setting is desirable, especially in the aviation field. The observer instead of minutely inspecting each setting may, at a glance, or other means, determine whether one or more indicators during flight have departed from the normal. Disalignment is rapidly observed or determined. The navigator may thereupon make the adjustment which will bring the indicator to the reference line 14, to reestablish normal or predetermined operating conditions of the instrument.

By reason of the mode of operation of the instruments of the panel as described, fatigue occasioned by the necessity for critically observing each instrument is avoided. The time consumed in determining any change from normal or predetermined operation is negligible.

In this manner, I have provided a novel instrument panel and method of maintaining its observation.

Thus it will be observed that for maintenance of the instruments from observing them on the panel, no special care need be given where the dial moves clockwise or counterclockwise, as the disalignment of the indicator of each particular dial from the normal or predetermined setting is all that is necessary in order to give it the attention which its new reading may require.

While in accordance with the preferred form of my invention, co-axial positioning of the bearing for the casing and the instrument needle motivating apparatus is desirable, this is not essential as it is sufficient that the edge of the dial be brought substantially tangential to the panel adjacent the apertures 11 and thus, the various instruments may be of different dimensions without in any way defeating the desirable features of the panel mounting.

It will also be observed that while, in accordance with the embodiment illustrated in Figure 3, arcuate adjustment of about 90° may be obtained of the instrument casing, substantial increase of this adjustment may be obtained within the limits of flexibility of the connector 29 or the like element by the arrangement shown in Figure 4. In this embodiment, the casing of the instrument 13a has its side wall 34a provided with a worm wheel 35a. A worm 38a on the shaft 37a is held in meshing engagement by the bearings 36a and 36b which are disposed upon a side plate 19 and bracket 15, respectively.

The shaft 37a extends through the front face of the panel 10 and the control knob 39a is manipulated in accordance with the embodiment previously described. In this way, the casing of the instrument 13a may be micrometrically moved as a whole, with its indicator 31a for relative positioning of one instrument to another. The irreversibility of the worm wheel and worm assures maintenance of the instrument casing in any predetermined adjusted position, without requiring special friction means as in the prior embodiment.

Thus, in the prior embodiment, after the indicator 31a is brought into operation, manipulation of the knob 39a is resorted to, to bring the indicator extension 32a with the casing in alignment with the indicia 14. In other respects, the operation of this embodiment conforms to that previously described.

It will be understood that the mode of adjustment of the instrument casing with respect to the panel is illustrative and that other arrangements will become apparent to the skilled worker for movement of the dial casing with its dial and indicator needle in reference to indicia on the panel, to secure alignment or adjustment and thereby to position the casings with their indicators and needles, for positioning of these needles in reference to each other, in order to secure alignment, in which event one or more properly maintained needles will serve as indicia for a needle or indicator which may vary from the normal or predetermined position during operation.

Accordingly, while I have illustrated my invention, the scope thereof is not to be limited thereby but is intended to fall within the scope of the appended claims.

Having thus described my invention and illustrated its use, what I claim as new and desire to secure by Letters Patent, is—

1. A panel having a plurality of spaced aligned viewing apertures supporting an indicating instrument behind each aperture, each instrument comprising a casing, an arcuate dial and a rotatable indicator the outer portion of which extends transversely across the dial, frame means rotatably supporting the casing behind an aperture with the dial viewable thereat, means mounted on the casing and frame means and extending to the front of the panel for rotatably adjusting the casing to bring the pointer to a desired datum position.

2. An instrument panel in accordance with claim 1, wherein said panel includes on the face thereof reference indicia aligned on the face of the panel for viewing the aligned indicators with reference to the indicia.

3. A panel supporting a plurality of aligned indicating instruments, each instrument being viewable through an aperture of the panel and each instrument comprising a casing, an arcuate dial and a rotatable indicator, the outer portion of which extends transversely across the dial, frame means rotatably supporting the casing behind the aperture with the dial viewable thereat, means mounted on the casing and frame means and extending to the front of the panel for rotatably adjusting the casing to bring the pointer to a desired datum position.

LIAN-TONG WEN.

REFERENCES CITED

The following references are of record in the file of this patent:

UNITED STATES PATENTS

| Number | Name | Date |
| --- | --- | --- |
| Re. 18,283 | Johnson | Dec. 15, 1931 |
| 529,433 | Van Fleck | Nov. 20, 1894 |
| 1,882,087 | Ocker | Oct. 11, 1932 |
| 2,112,704 | Mackay | Mar. 29, 1938 |

FOREIGN PATENTS

| Number | Country | Date |
| --- | --- | --- |
| 25,526 | Great Britain | Nov. 20, 1902 |
| 669,752 | Germany | Jan. 3, 1939 |